Jan. 31, 1967  E. R. BEMAN  3,301,097
INDEX MECHANISM

Filed March 31, 1965  2 Sheets-Sheet 1

INVENTOR.
E. ROY BEMAN

BY Richard W. Treverton

Jan. 31, 1967  E. R. BEMAN  3,301,097

INDEX MECHANISM

Filed March 31, 1965  2 Sheets-Sheet 2

3,301,097
INDEX MECHANISM
Earl Roy Beman, Rochester, N.Y., assignor to The Gleason Works, Rochester, N.Y., a corporation of New York
Filed Mar. 31, 1965, Ser. No. 444,263
10 Claims. (Cl. 74—820)

The present invention relates to a mechanism for intermittently indexing the work spindle of a gear generating machine and for generally similar purposes.

The invention provides a simple mechanism capable of indexing with high accuracy in the rapid and yet smooth manner characteristic of Geneva motions. Indexing is effected and the mechanism then is locked up by the axial shifting, preferably by fluid pressure, of a single unit which constitutes the driven element of the Geneva motion.

A mechanism according to the invention comprises a carrier, a spindle rotatable in the carrier, a Geneva driven wheel co-rotatable with the spindle and having equiangularly spaced radial slots and also having similarly spaced clutch teeth, the carrier having mating clutch teeth, a Geneva driver rotatable in the carrier on an axis parallel to the spindle and having a drive pin engageable in the slots of the wheel, said driver being adapted to advance the wheel by one pitch upon each rotation thereof in which the pin engages one of said slots, and means to shift the wheel axially in the carrier between (a) a first position wherein the clutch teeth of the wheel and carrier are engaged and the wheel is unengageable by the driver and (b) a second position wherein the clutch teeth of the wheel and carrier are disengaged and the pin of the driver is engageable with said slots.

Figure 1:
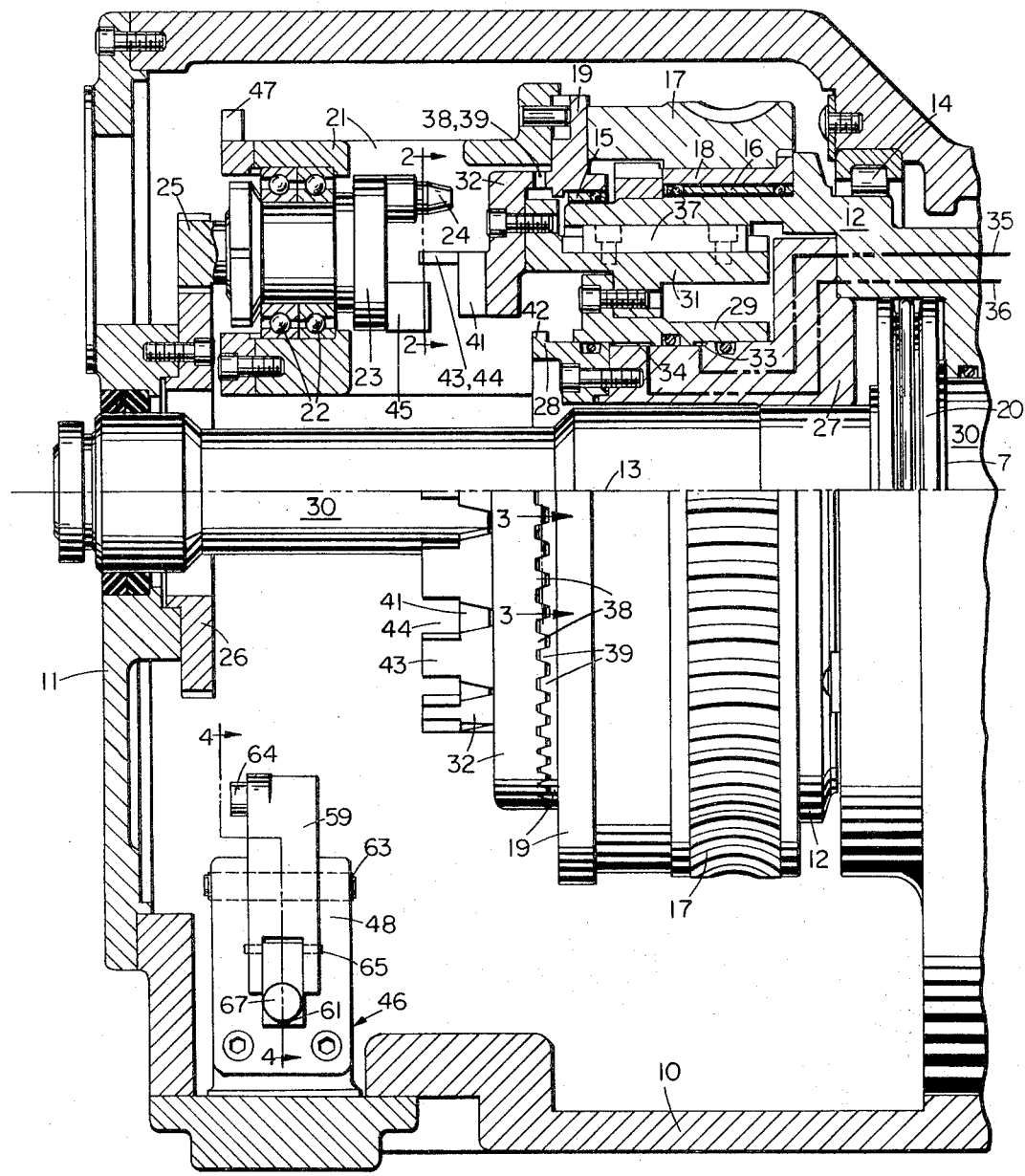
Figure 4:
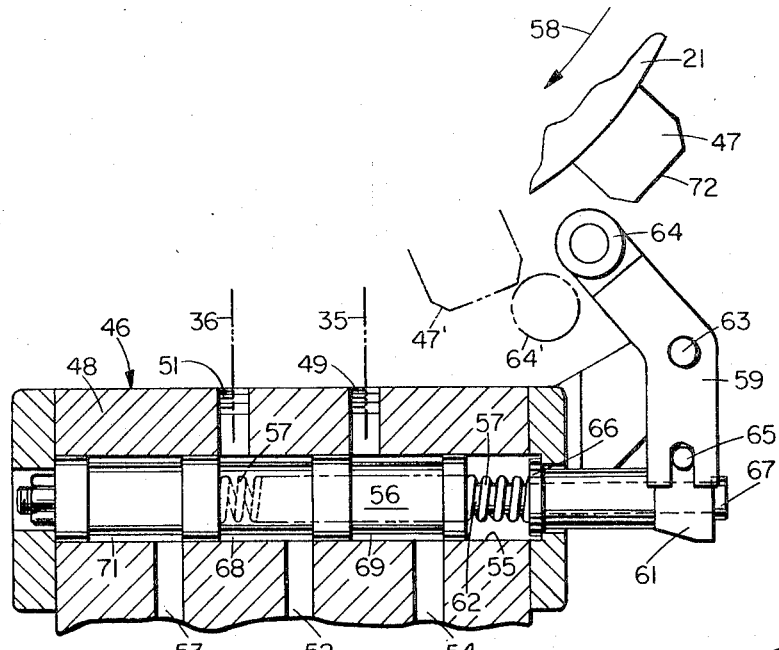
Figure 2:
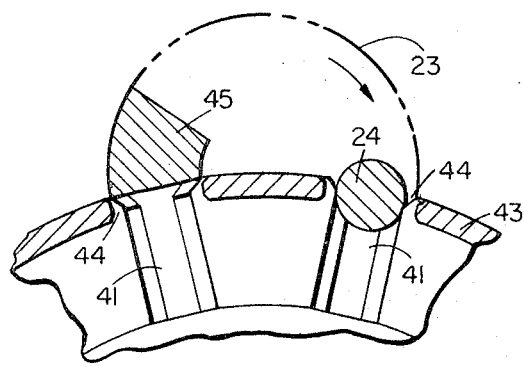
Figure 3:
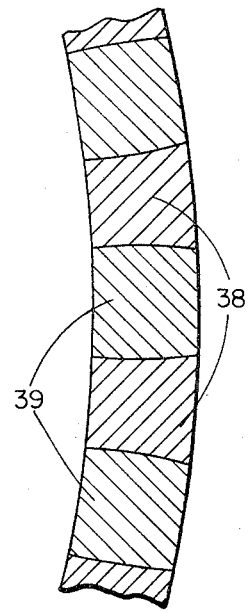

A preferred embodiment of the invention is shown in the accompanying drawings, wherein:

FIG. 1 is a vertical section through the housing of the mechanism, with the lower portion of the index carrier appearing in elevation;

FIGS. 2 and 3 are detail sections in planes 2—2 and 3—3 of FIG. 1, respectively through the Geneva and the tooth clutch elements; and FIG. 4 is a side view, partly in section approximately in the planes designated 4—4 in FIG. 1.

Referring to FIG. 1, the housing, which in this instance is the work head of a bevel gear generating machine, comprises a body 10 and a removable end plate 11. A multi-part work spindle 12 is mounted in body 10 for rotation about axis 13. The particular spindle illustrated in tubular and contains a cylinder chamber in which a piston 20 is reciprocable, the piston acting through a draw rod 30 to actuate a work holding chuck that is mounted on the right end of the spindle (not shown). The spindle is mounted on a pair of axially spaced roller bearings 14, of which only the bearing at the left end of the spindle is illustrated. The spindle is also rotatable about axis 13 on ball sleeve bearings 15 and 16 within the index carrier unit, which in this particular embodiment is supported by the spindle. The carrier unit comprises a worm wheel 17 mounted on a bearing race ring 18, a face clutch member 19 and a Geneva drive bracket 21 mounted on member 19. Rotatable on ball bearings 22 in the bracket there is a Geneva driver 23 having at one end a drive pin 24 and at its opposite end a pinion 25. The pinion meshes with a gear 26 that is secured to the housing in coaxial relation with spindle 12.

Inner sections 27 and 28 of spindle 12 support for axial reciprocation thereon a Geneva driven wheel unit which comprises a tubular piston 29, a ring 31 and a face clutch member 32, all of which are coaxial with spindle 12. The piston 29 is reciprocated by the alternate application of hydraulic pressure to annular chambers 33 and 34 that are formed between the piston and spindle sections 27, 28. The pressure is applied through the respective passages shown schematically by broken lines 35 and 36. Chambers 33 and 34 are sealed in a conventional manner by O-rings disposed in annular grooves in the piston and in the spindle sections. Ring 31 carries a key 37 which connects it to the spindle 12 for co-rotation therewith. Clutch member 32 has face clutch teeth 38 meshing with complementary teeth 39 on clutch member 19. The teeth 38, 39 taper in thickness in an axial direction, as shown in the lower portion of FIG. 1, so that when member 32 is pressed axially to the right, by pressure in chamber 34, they mesh without backlash. The number of teeth 38, and also of teeth 39, is a multiple of the number of teeth to be cut in a work gear (not shown) mounted on the right end of the spindle. Member 32 has thereabout a plurality of equiangularly spaced radial slots 41, corresponding in number to the number of teeth of the work gear. These slots are adapted to receive and pass drive pin 24 (see FIG. 2) when the Geneva driven wheel, 29, 31, 32, is in its left limit position, wherein piston 29, FIG. 1, abuts flange 42 of spindle section 28.

Clutch member 32 has an annular flange 43 which projects axially to the left (in FIG. 1) and is interrupted by slots 44 that are aligned with and somewhat wider than slots 41. These slots 44 are adapted to pass a locking sector 45 on Geneva driver 23, diametrically opposite to pin 24. The flange 43 and sector 45 are of such length that they are engageable in any position of axial reciprocation of the Geneva driven wheel 29, 31, 32.

In the particular gear generating machine of which the illustrated mechanism is a part, the carrier unit 17, 18, 19, 21 is rocked back and forth about axis 13 by a reversingly rotating worm (not shown) which is mounted in body 10 and drives the worm wheel 17. As the carrier turns clockwise (in FIG. 2), the pinion 25, FIG. 1, is rolled on stationary gear 26, and rotates the Geneva driver 23 clockwise relative to the carrier. On the return rotation of the carrier the driver 23 rotates counterclockwise. Throughout this rocking motion of the carrier, pressure in chamber 34 holds clutch teeth 38, 39 engaged so that the spindle 12 turns as a unit with the carrier, and the rotation of driver 23 is idle, except in the latter part of the carrier's clockwise rotation when pressure is applied to chamber 33 to disengage the clutch teeth and cause the drive to index the spindle relative to the carrier.

To achieve this periodic indexing a reversal of pressure to passages 35 and 36 is effected by a reversing valve 46, FIGS. 1 and 4, that is supported by housing 10 and is actuated by a cam 47 on part 21 of the carrier. The body 48 of valve 46 has ports 49 and 51 connected respectively to passages 35 and 36 by suitable conduits and a swivel connection around spindle 12 (not shown). The valve body 48 also has a pressure port 52 connected to a suitable source of hydraulic pressure, and two spaced exhaust ports 53 and 54. All of these ports open into valve cylinder 55 in which a valve plunger 56 is slidable. The plunger is normally held in its left limit position (in FIG. 4) by a spring 57. It is moved to the right by cam 47, moving clockwise as indicated by arrow 58, the cam acting through lever 59, connector 61 and a rod 62 rigidly connected to the plunger. The lever is pivoted by pin 63 to body 48 and carries at its upper end a roller 64 engageable by the cam. At its lower end the lever has a pin-and-slot connection 65 to connector 61. The latter is slidable on rod 62 and confined between the head 67 of the rod and a washer 66 abutting spring 57.

In the normal spring-held position of the valve, circumferential grooves 68 and 69 of plunger 56 respectively connect pressure port 52 to port 51 (passage 36) and exhaust port 54 to port 49 (passage 35), so that the Geneva driven unit 29, 31, 32 is held in its right limit position, FIG. 1, wherein clutch teeth 38, 39 are engaged. As the index carrier 17, 19, 21 (turning in the direction 58, FIG. 4) approaches its clockwise limit position, cam 47 abuts and moves roller 64 to the broken line position 64', swinging lever 59 counterclockwise and causing connector 61 to move rod 62, 67, and plunger 56 to the right. In this position, circumferential groove 71 of the plunger connects exhaust port 53 to passage 36 and pressure port 52 to passage 35, causing the Geneva driven unit 29, 31, 32 to be moved axially to the left in FIG. 1. The Geneva driver then advances the spindle 12, by one pitch of the work gear, relative to the carrier. When the cam has passed the roller and is in its terminal position shown in broken lines at 47', spring 57 returns the valve and lever 59 to their normal positions, causing the Geneva driven wheel to be returned to its position wherein clutch teeth 38, 39 are engaged. During return motion of the carrier, counterclockwise in FIG. 4, the cam swings the roller 64 and lever 59 clockwise, but this is without effect upon the valve, the connector 61 merely sliding along rod 62 against the compression of spring 57. When the cam has passed the roller the spring returns the lever and connector to the position thereof shown in full lines in FIG. 4.

Considering the carrier 17, 19, 21 to be the body of reference, and the driver 23 to be rotating clockwise in FIG. 2, the indexing action is as follows: On each turn of the driver the sector 45 passes idly through the right and left slots 44. The valve actuating cam 47 is in such phase in relation to rotation of the driver that pressure is applied to chamber 33 to shift the Geneva driven wheel to the left in FIG. 1 just as the sector has entered the left slot 44, whereby the sector holds the driven wheel (and spindle 12) against rotation while the shifting is occurring and while, momentarily, the clutch teeth 38, 39 are disengaged and the pin 24 is not yet engaged with a slot 41.

As the sector 45 leaves the left slot 44, the position shown in FIG. 2, the pin 24 enters the right slot 41 and during the ensuing one-half turn of the driver 23, indexes the driven wheel 29, 31, 32 and the spindle counterclockwise by one pitch. This indexing action occurs in the smooth manner usual in Geneva motions by reason of the pin 24 entering and departing the slot 41 tangentially. As the pin leaves slot 41 the sector 45 enters the slot 44 then at the right in this view. At this time the cam 47 has just passed the roller 64 and the spring 57 has returned the valve to its normal position, so that now pressure is applied to chamber 34, shifting the Geneva driven wheel to the right (in FIG. 1) and engaging the clutch teeth 38, 39 while the wheel is being held against rotation by the sector.

By angularly adjusting the drive to worm wheel 17 to reposition the angle through which the carrier 17, 21 oscillates relative to housing 10, the mechanism illustrated may be made to index at any desired position of clockwise rotation of the carrier. For example, if the angle is so repositioned that cam 47 is in the position shown in full lines in FIG. 4 near the beginning of clockwise rotation of the carrier, then indexing will occur in the early part of such clockwise rotation, rather than in the latter part thereof as described above. Also, by replacing valve 46 with a valve of opposite hand and repositioning the angle of carrier oscillation relative to housing 10, the mechanism may be made to index at any desired phase of counterclockwise rotation of the carrier.

Having now described the preferred embodiment of my invention and its mode of operation, what I claim is:

1. An index mechanism comprising a carrier, a spindle rotatable in the carrier, a Geneva driven wheel co-rotatable with the spindle and having equiangularly spaced radial slots and also similarly spaced clutch teeth, the carrier having mating clutch teeth, a Geneva driver rotatable in the carrier on an axis parallel to the spindle and having a drive pin engageable in the slots of the wheel, said driver being adapted to advance the wheel by one pitch upon each rotation thereof in which the pin engages one of said slots, and means to shift the wheel axially in the carrier between (a) a first position wherein the clutch teeth of the wheel and carrier are engaged and the wheel is unengageable by the drive and (b) a second position wherein the clutch teeth of the wheel and carrier are disengaged and the pin of the driver is engageable with said slots.

2. A mechanism according to claim 1 in which said face clutch teeth are of tapering thickness in an axial direction so that in said first position of the wheel said teeth may engage without backlash.

3. A mechanism according to claim 2 in which the means to shift the wheel comprises a member for exerting an axially directed pressure against the wheel to maintain such engagement without backlash while the wheel is in said first position.

4. A mechanism according to claim 3 in which the means to shift the wheel include a piston member movable in a cylinder chamber in a member coaxial of the spindle, one member being integral with the wheel and the other member being supported against axial motion relative to the spindle.

5. A mechanism according to claim 4 in which the spindle is supported against axial motion in the carrier, the wheel is axially movable on the spindle, and said other member is integral with the spindle.

6. A mechanism according to claim 1 in which there are formations on the wheel and driver which engage to hold the wheel against rotation before the pin enters and after it departs from a slot of the wheel and which are disengaged while the pin is engaged in a slot, said formations being engageable in any position of axial shifting motion of the wheel.

7. A mechanism according to claim 6 in which said formations comprise an axially projecting annular flange on the wheel having therearound spaced radial slots aligned with the first-mentioned slots and further comprise an axially projecting sector on the driver adapted to enter one of the slots in the flange as the pin leaves an adjacent first-mentioned slot, and to depart from a slot of the flange as the pin enters an adjacent first-mentioned slot, the sector during each complete turn of the driver passing through two adjacent slots of the annular flange, the axial lengths of the sector and flange being such that said passing engagement occurs in any position of axial shifting of the wheel.

8. A mechanism according to claim 1 having a housing in which said carrier is rotatable about the axis of the spindle, and gearing between the housing and driver for rotating the latter by and upon rotation of the carrier in the housing.

9. A mechanism according to claim 8 in which said means to shift the wheel axially are operable by and upon rotation of the carrier in the housing.

10. A mechanism according to claim 9 in which said means to shift the wheel axially are fluid pressure operated and include valve means operable by and upon rotation of the carrier into predetermined relation to the housing.

References Cited by the Examiner
UNITED STATES PATENTS 2,898,780  8/1959  Carlsen et al. _____ 74—820 X
2,979,971  4/1961  Darash _____ 74—820

FRED C. MATTERN, Jr., *Primary Examiner.*